United States Patent
Molnar et al.

(10) Patent No.: US 10,252,683 B2
(45) Date of Patent: Apr. 9, 2019

(54) MOUNTING BAR ASSEMBLY FOR A MATERIALS HANDLING VEHICLE

(71) Applicant: Crown Equipment Corporation, New Bremen, OH (US)

(72) Inventors: Christian Molnar, Forstinning (DE); Christoph Babel, Tuerkenfeld (DE); James V. Kraimer, Haimhausen (DE); Michael P. Gallagher, Greenville, OH (US); Peter Adelsperger, Erding (DE); Marc Voelke, Hallbergmoos (DE); Luying Sun, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 15/427,360

(22) Filed: Feb. 8, 2017

(65) Prior Publication Data

US 2017/0225627 A1    Aug. 10, 2017

Related U.S. Application Data

(60) Provisional application No. 62/292,940, filed on Feb. 9, 2016.

(51) Int. Cl.
*B60R 11/00*       (2006.01)
*B60R 11/02*       (2006.01)
*B66F 9/075*       (2006.01)

(52) U.S. Cl.
CPC ........ *B60R 11/0229* (2013.01); *B66F 9/0759* (2013.01); *B66F 9/07504* (2013.01); *B60R 2011/004* (2013.01)

(58) Field of Classification Search
CPC ........... B60R 11/0229; B60R 2011/004; B66F 9/07504; B66F 9/0759
See application file for complete search history.

(56) References Cited

U.S. PATENT DOCUMENTS

| 5,245,144 A | 9/1993 | Stammen |
| 5,683,063 A | 11/1997 | Seiders et al. |

(Continued)

FOREIGN PATENT DOCUMENTS

| CN | 103922243 A | 7/2014 |
| DE | 9404515 U1 | 7/1994 |

(Continued)

OTHER PUBLICATIONS

Christoph Erbel; International Search Report and Written Opinion; International Application No. PCT/US2017/016912; dated May 15, 2017; European Patent Office; Rijswijk, Netherlands.

(Continued)

*Primary Examiner* — Faye M Fleming
(74) *Attorney, Agent, or Firm* — Stevens & Showalter, LLP (57) ABSTRACT

A mounting bar assembly mounted to a materials handling vehicle includes a mounting bar extending from a body portion of the materials handling vehicle, a housing mounted to the mounting bar and supporting at least one electronic device, and cabling that extends to the housing through a hollow interior portion defined within the mounting bar. The mounting bar assembly further includes cabling for providing communication between the at least one electronic device and control structure of the vehicle. The housing is mounted to the mounting bar such that the housing can be situated in a plurality of positions along at least a portion of the length of the mounting bar while the cabling is maintained within the hollow interior portion.

43 Claims, 8 Drawing Sheets

(56) References Cited

U.S. PATENT DOCUMENTS

| | | | |
|---|---|---|---|
| 6,113,047 A | 9/2000 | Wung et al. | |
| 6,464,025 B1 | 10/2002 | Koeper et al. | |
| 6,561,469 B1 | 5/2003 | Masuda et al. | |
| 6,575,419 B1 | 6/2003 | Masuda et al. | |
| 6,883,625 B2* | 4/2005 | Trego | B62D 51/001 |
| | | | 180/19.2 |
| 6,929,224 B1 | 8/2005 | Masuda et al. | |
| 6,948,739 B2* | 9/2005 | Gallagher | B62B 3/0612 |
| | | | 150/166 |
| 7,097,082 B2 | 8/2006 | Wallaker | |
| 7,641,020 B2 | 1/2010 | Lohmann | |
| 8,358,279 B2* | 1/2013 | Han | G06F 3/016 |
| | | | 310/317 |
| 8,646,826 B2 | 2/2014 | Wihinen et al. | |
| 8,905,183 B2* | 12/2014 | Warner | B66F 9/0759 |
| | | | 180/315 |
| 8,944,395 B2* | 2/2015 | Bonito | B60R 11/0235 |
| | | | 248/276.1 |
| 9,035,208 B2* | 5/2015 | Warner | H01H 9/0066 |
| | | | 200/401 |
| 9,095,946 B2 | 8/2015 | Kotula et al. | |
| 2003/0173476 A1 | 9/2003 | Masuda et al. | |
| 2006/0243517 A1 | 11/2006 | Lohmann | |
| 2007/0262221 A1 | 11/2007 | Schroder | |
| 2012/0235804 A1 | 9/2012 | Gilbride et al. | |
| 2015/0217702 A1* | 8/2015 | Jacobsthal | A01D 41/12 |
| | | | 296/190.01 |
| 2017/0072870 A1* | 3/2017 | Brotherton | B60R 11/0235 |
| 2017/0166059 A1* | 6/2017 | Inagaki | B60K 37/02 |

FOREIGN PATENT DOCUMENTS

| | | |
|---|---|---|
| DE | 10057402 A1 | 5/2001 |
| DE | 102010026383 A1 | 1/2012 |
| EP | 655413 A1 | 5/1995 |
| EP | 717005 A1 | 6/1996 |
| EP | 1205429 A1 | 5/2002 |
| EP | 1690820 A1 | 8/2006 |
| EP | 1857404 A3 | 6/2008 |
| EP | 2384955 A2 | 11/2011 |
| WO | 9625300 A1 | 8/1996 |

OTHER PUBLICATIONS

Agnes Wittmann-Regis; International Preliminary Report on Patentability; International Application No. PCT/US2017/016912; dated Aug. 23, 2018; International Bureau of WIPO; Geneva, Switzerland.

* cited by examiner

MOUNTING BAR ASSEMBLY FOR A MATERIALS HANDLING VEHICLE

CROSS REFERENCE TO RELATED APPLICATION

This application claims the benefit of U.S. Provisional Patent Application Ser. No. 62/292,940, filed Feb. 9, 2016, and entitled "MOUNTING BAR ASSEMBLY FOR A MATERIALS HANDLING VEHICLE", the entire disclosure of which is hereby incorporated by reference herein.

FIELD OF THE INVENTION

The present invention relates to a mounting bar assembly for mounting at least one electronic device on a materials handling vehicle.

BACKGROUND OF THE INVENTION

A materials handling vehicle, such as a rider pallet truck, includes a power unit, a steering control unit, and a load handling assembly, which may comprise a pair of load carrying forks. The power unit includes an operator's compartment in which an operator may ride while controlling the truck. A control handle is provided in the operator's compartment, which control handle is used by the operator to control traveling movement of the vehicle. The operator's compartment may further include other control structure for controlling other functions of the vehicle, such as fork raise/lower, coast control, etc.

BRIEF SUMMARY OF THE INVENTION

One aspect of the present invention relates to a mounting bar assembly mounted to a materials handling vehicle comprising a mounting bar extending from a body portion of the materials handling vehicle, a housing mounted to the mounting bar, the housing supporting at least one electronic device, and cabling that extends to the housing through a hollow interior portion defined within the mounting bar. The cabling provides communication between the at least one electronic device and control structure of the vehicle. The housing is mounted to the mounting bar such that the housing can be situated in a plurality of positions along at least a portion of the length of the mounting bar while the cabling is maintained within the hollow interior portion.

The mounting bar assembly may comprise an inner member and an outer member affixed to the inner member to define the hollow interior portion therebetween. The mounting bar assembly may further comprise fastening members that affix the inner member to the outer member, wherein each of the fastening members is located on an inner side of the mounting bar. The inner member may extend into and be affixed to the body portion of the vehicle.

The cabling may extend from the housing into the hollow interior portion of the mounting bar through an elongate slot formed in the mounting bar.

The mounting bar assembly may further comprise a clamp member that is affixed to the housing and surrounds the mounting bar therebetween to secure the housing to the mounting bar. The clamp member may cover the slot and the cabling extending through the slot to the housing.

The cabling may include sufficient slack so as to allow the housing to be situated in a plurality of positions along the mounting bar.

The mounting bar may be mounted proximate to an operator station of the materials handling vehicle such that an operator can interact with the at least one electronic device while positioned in the operator station.

The mounting bar may extend generally vertically upwardly from the body portion of the materials handling vehicle.

The mounting bar assembly may further comprise at least one light structure mounted to the mounting bar for emitting light. The mounting bar may include two light structures, one mounted in the first side arm of the mounting bar and one mounted in the second side arm of the mounting bar. The light structures may emit light that is visible from the front and back of the materials handling vehicle. The light structures may be capable of emitting lights of different colors toward the front and back of the materials handling vehicle.

Another aspect of the present invention relates to a mounting bar assembly mounted to a materials handling vehicle comprising a mounting bar including a first side arm extending from a body portion of the materials handling vehicle, a second side arm extending from the body portion of the materials handling vehicle, and a top member spanning between the first side arm and the second side arm. The mounting bar assembly includes a housing mounted to the top member, the housing supporting at least one electronic device, and cabling that extends to the housing through a hollow interior portion defined within the top member and at least one of the first side arm and the second side arm. The cabling provides communication between the at least one electronic device and control structure of the vehicle. The housing is mounted to the top member such that the housing can be situated in a plurality of horizontal positions along the top member while the cabling is maintained within the hollow interior portion.

At least one of the first side arm and the second side arm may comprise an inner member and an outer member affixed to the inner member to define a portion of the hollow interior portion therebetween. The mounting bar assembly may further comprise fastening members that affix the inner member to the outer member, wherein each of the fastening members is located on an inner side of the mounting bar. The inner member may extend into and be affixed to the body portion of the vehicle.

The cabling may extend from the housing into the hollow interior portion of the mounting bar through an elongate slot formed in the top member of the mounting bar.

The slot may be formed in an underside of the top member.

The mounting bar assembly may further comprise a clamp member that is affixed to the housing and surrounds the top member therebetween to secure the housing to the top member. The clamp member may cover the slot and the cabling extending through the slot to the housing.

The cabling may include sufficient slack so as to allow the housing to be situated in a plurality of horizontal positions along the top member.

The first side arm and the second side arm may be mounted proximate to an operator station of the materials handling vehicle such that an operator can interact with the at least one electronic device while positioned in the operator station.

The first side arm and the second side arm may extend generally vertically upwardly from the body portion of the materials handling vehicle and are spaced apart from one another and located adjacent to respective first and second sides of the body portion.

Yet another aspect of the present invention relates to a materials handling vehicle comprising a main body portion including a power unit and an operator station, a load handling assembly, a mounting bar extending from the main body portion of the materials handling vehicle, and a housing mounted to the mounting bar, the housing supporting at least one electronic device. The materials handling vehicle further comprises cabling that extends to the housing through a hollow interior portion defined within the mounting bar, the cabling providing communication between the at least one electronic device and control structure of the vehicle. The housing is mounted to the mounting bar such that the housing can be situated in a plurality of positions along at least a portion of the length of the mounting bar while the cabling is maintained within the hollow interior portion.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
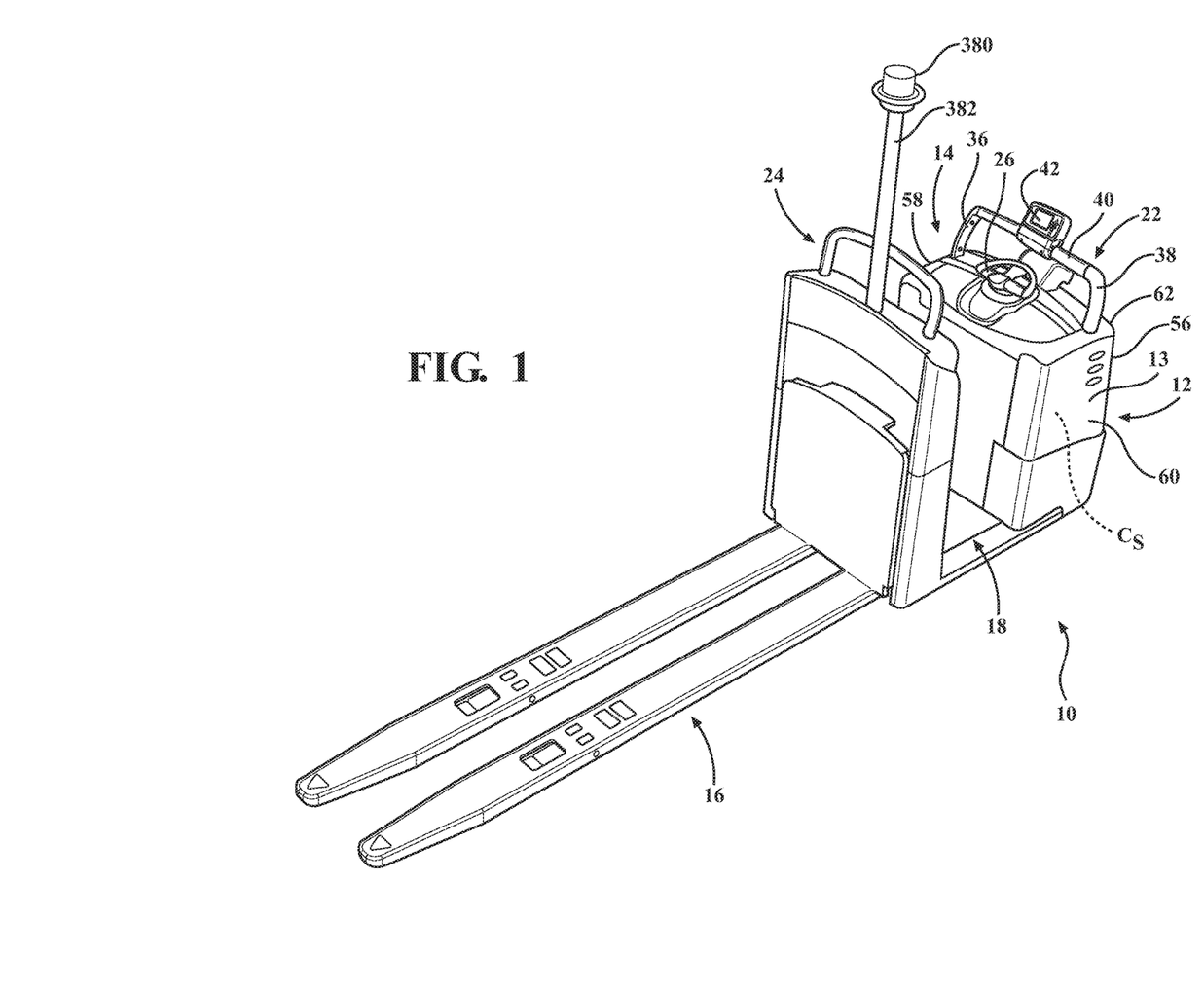
FIG. 1 is a perspective view of a materials handling vehicle including a mounting bar assembly according to an aspect of the present invention.

Referring now to FIG. 1, a materials handling vehicle 10 (hereinafter "vehicle") is shown. While the present invention is illustrated and described herein with reference to the illustrated vehicle 10, which comprises a rider pallet truck, it will be apparent to those skilled in the art that the present invention may be used in a variety of other types of materials handling vehicles.

As shown in FIG. 1, the vehicle 10 comprises a power unit 12 having a power unit cover 13 and defining an operator station 14 (also referred to as an operator's compartment), and a load handling assembly 16 comprising a pair of load carrying forks in the illustrated embodiment, although the load handling assembly 16 could alternatively comprise other structure, such as a single fork, more than two forks, a towing component, etc. The operator station 14 includes a platform 18 onto which an operator may step and ride while controlling the vehicle 10. A rail 24 may be provided for the operator to grip while riding on the platform 18. A control handle 26 is provided in the operator station 14 for the operator to control traveling movement of the vehicle 10. The control handle 26 may also support one or more other vehicle functions, such as, for example, fork raise/lower, coast control, etc.

Figure 2:
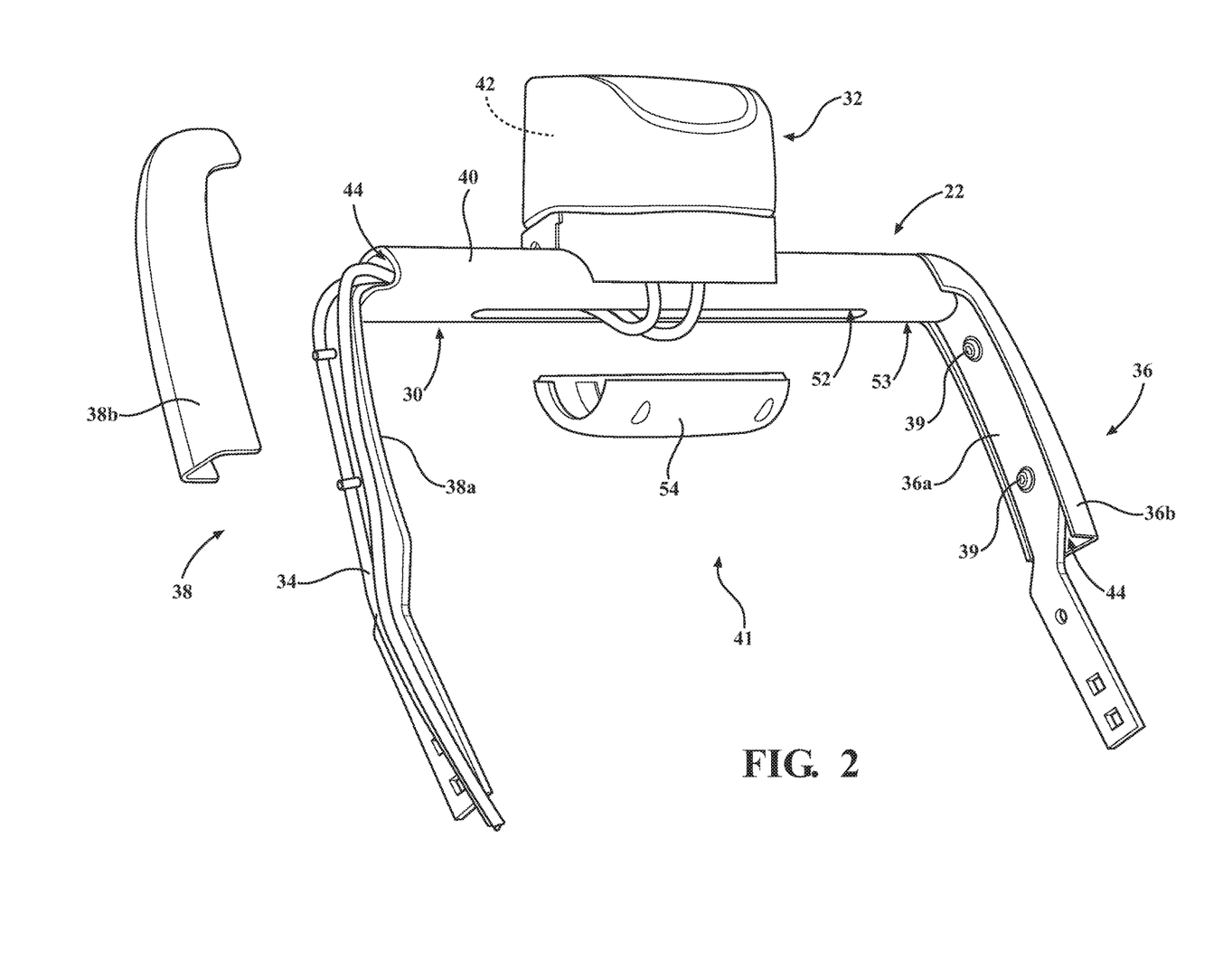
FIG. 2 is a partially exploded view of the mounting bar assembly shown in FIG. 1.

With reference now to FIG. 2, the vehicle further comprises a mounting bar assembly 22, which is shown in a partially exploded view in FIG. 2. The mounting bar assembly 22 includes a mounting bar 30, a housing 32, and cabling 34. The mounting bar 30 comprises a first side arm 36 extending generally vertically upwardly from the power unit 12, a second side arm 38 spaced from the first side arm 36 and extending generally vertically upwardly from the power unit 12, and a top member 40 spanning generally horizontally between the first side arm 36 and the second side arm 38. As shown in FIG. 1, the first and second side arms 36, 38 and the top member 40 provide the mounting bar assembly 22 with an upside-down U-shape or downward-facing C-shape, although it is noted that the angle, length, and configuration of each of the first and second side arms 36, 38 and the top member 40 shown in the figures are exemplary and could be modified as desired.

The housing 32 is mounted to the top member 40 as will be further described below and supports at least one electronic device 42 (see FIGS. 1 and 4A-4C). The size and shape of the housing 32 may be configured depending on the size, shape, and number of electronic devices 42 supported thereby. As shown in FIG. 1, the housing is positioned adjacent to the operator station 14 to allow the operator to use the electronic device(s) 42 supported by the housing 32 while the operator is located in the operator station 14. In the embodiment shown, the mounting bar assembly 22 is positioned on the opposite side of the operator station 14 than the load handling assembly 16 such that the operator can use the electronic device(s) 42 while facing the forward traveling direction of the vehicle 10, i.e., the direction opposite to the load handling assembly 16. The at least one electronic device 42 is attached to a first end of the cabling 34 to provide communication between the at least one electronic device 42 and control structure Cs (see FIG. 3) within the power unit 12 as will be described in greater detail below.

Referring still to FIG. 2, the first side arm 36 may comprise an inner member 36a and an outer member 36b that is affixed to the inner member 36a to define a portion of a hollow interior portion 44 of the mounting bar 30 therebetween. The second side arm 38 may comprise an inner member 38a and an outer member 38b that is affixed to the inner member 38a to define another portion of the hollow interior portion 44 therebetween. The inner members 36a, 38a may be affixed to the respective outer members 36b, 38b via fastening members 39, such as bolts. The fastening members 39 may be inserted through corresponding openings formed in an inner side 41 of the mounting bar 30, such that visibility of the fastening members 39 from the sides of the vehicle 10 is limited. Moreover, the first and second side arms 36, 38 may be rounded and smooth to further enhance aesthetics of the mounting bar assembly 22.

As shown in FIG. 2, the cabling 34 extends from the housing 32 through an elongate slot 52 formed in the top member 40 into yet another portion of the interior hollow portion 44 defined within the top member 40. In the embodiment shown in FIG. 2, the elongate slot 52 is formed in an underside 53 of the top member 40, wherein the mounting bar assembly 22 further includes a clamp member 54 that is affixed to the housing 32, e.g., by bolts, so as to surround the top member 40 therebetween to secure the housing 32 to the top member 40. The clamp member 54 covers both the elongate slot 52 and the cabling 34 extending through the elongate slot 52.

The housing/clamp member 32/54 may be tightly fastened to the top member 40, wherein appropriate measures would be required to loosen the housing/clamp member 32/54 from the top member 40 to allow movement of the housing/clamp member 32/54 in the horizontal direction, i.e., along the length of the top member 40. Such loosening may be facilitated by appropriate tooling or by hand. According to one aspect of the invention, specialized tooling is required to loosen the housing/clamp member 32/54 from the top member 40, wherein a service technician is required to reposition the housing/clamp member 32/54 on the top member 40. The top member 40 may have a circular or non-circular cross section, such as a generally oval or rectangular cross section. A non-circular cross section may be beneficial to avoid unwanted rotation of the housing/clamp member 32/54 on the top member 40 should the housing/clamp member 32/54 become loose.

Figure 3:
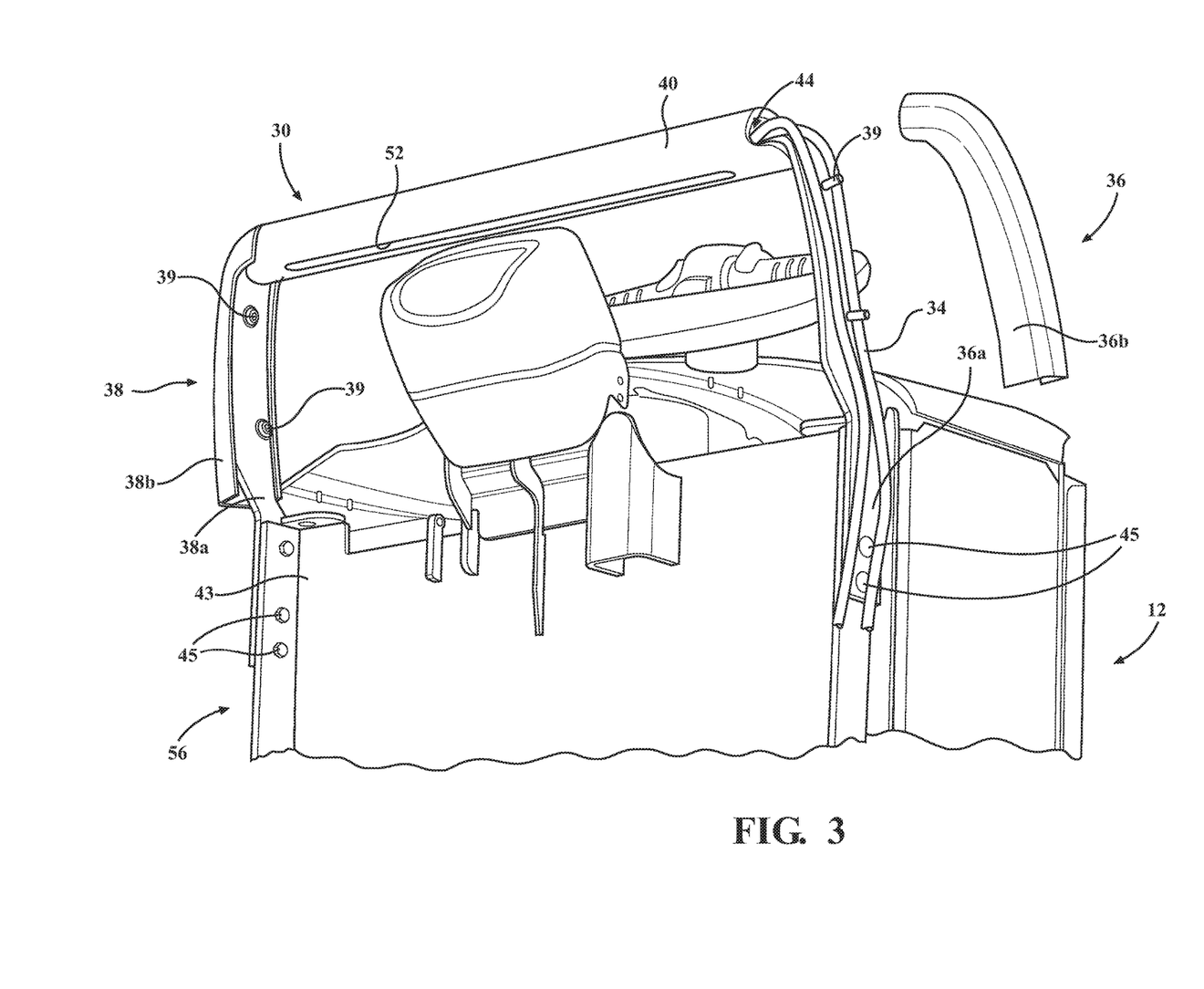
FIG. 3 is a partial cut away view showing an attachment of the mounting bar assembly to a power unit of the vehicle.

Referring now to FIG. 3, the cabling 34 extends through the hollow interior portion 44 of the mounting bar 30, i.e., through the top member 40 and the first side arm 36 (the cabling 34 is illustrated in FIG. 2 as extending through the top member 40 and the second side arm 38 to illustrate this alternate configuration), and out of the mounting bar 30 to the control structure Cs located within the power unit 12. The control structure Cs may be a conventional main or auxiliary vehicle controller, which is well known to those skilled in the art. The cabling 34 thus effects communication between the at least one electronic device 42 supported by the housing 32 and the control structure Cs to allow the operator to control one or more vehicle functions via the at least one electronic device 42.

As shown in FIG. 3, the first side arm inner member 36a and the second side arm inner member 38a in the embodiment shown extend into and are affixed to a body portion 56 of the power unit 12. More specifically, the first side arm inner member 36a and the second side arm inner member 38a are attached to an inner body portion 43 of the power unit 12 via fastening structures 45, e.g., bolts, shown in FIG. 3, wherein the power unit cover 13 is not shown in FIG. 3 to illustrate the attachment of the first and second side arm inner members 36a, 38a to the inner body portion 43 of the power unit 12.

The first side arm 36 and the second side arm 38 are mounted proximate to the operator station 14 of the vehicle 10 such that the operator can interact with the at least one electronic device 42 while positioned in the operator station 14 as discussed above, see FIG. 1. The first and second side arms 36, 38 may be spaced apart from one another and located adjacent to respective first and second sides 58, 60 of the body portion 56 on a side 62 of the operator station 14 opposite from the load handling assembly 16, see FIG. 1.

Figure 4A:
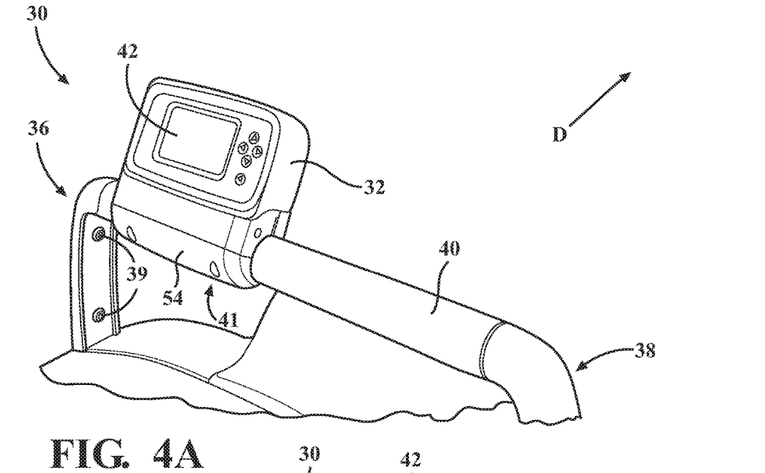
FIGS. 4A-4C are views showing a housing of the mounting bar assembly in three exemplary positions.
Figure 4B:
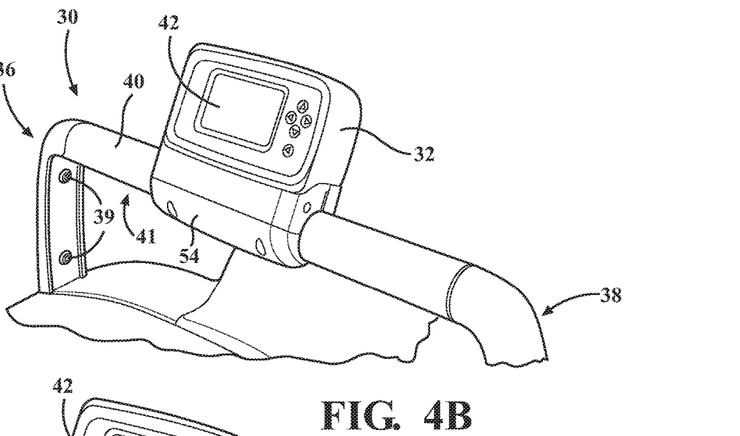
Figure 4C:
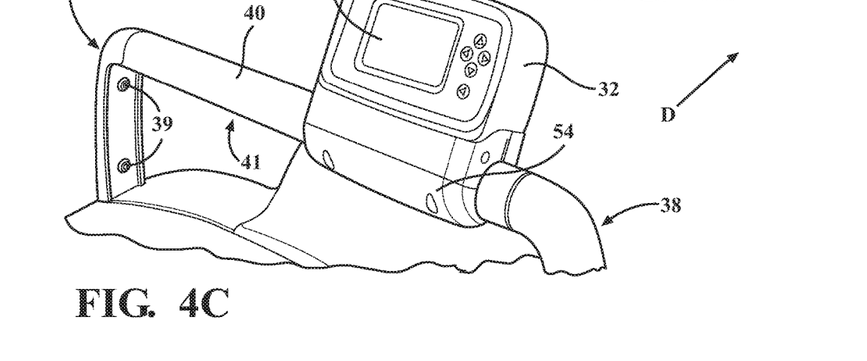

Turning now to FIGS. 4A-4C, the housing 32 is depicted in three exemplary positions along the top member 40 of the mounting bar 30. As noted above, the housing/clamping member 32/54 are mounted to the top member 40 such that the housing 32 can be situated in a plurality of positions along at least a portion of the length of the top member 40. Correspondingly, the cabling 34 provides sufficient slack so as to allow the housing 32 to be situated in a plurality of positions along the top member 40 of the mounting bar 30 while the cabling 34 is maintained within the hollow interior portion 44 of the mounting bar 30. In FIG. 4A, the housing 32 is located in a first exemplary position on the left side of the top member 40 with respect to the operator facing the direction of travel (D) of the vehicle 10; in FIG. 4B, the housing 32 is located in a second exemplary position near the center of the top member 40; and in FIG. 4C, the housing 32 is located in a third exemplary position on the right side of the top member 40 with respect to the operator facing the direction of travel (D) of the vehicle 10. As shown in FIGS. 4A-4C, the cabling 34 and all associated wire harnesses (not shown) are contained entirely within the mounting bar 30 or in the slot 52 underneath the clamp member 54 such that, the cabling 34 and wire harnesses are completely protected and hidden from view when the housing 32 is positioned at each illustrated location on the top member 40. While the housing 32 is shown in three exemplary locations in FIGS. 4A-C, other locations along the length of the top member 40 are possible.

Figure 5:
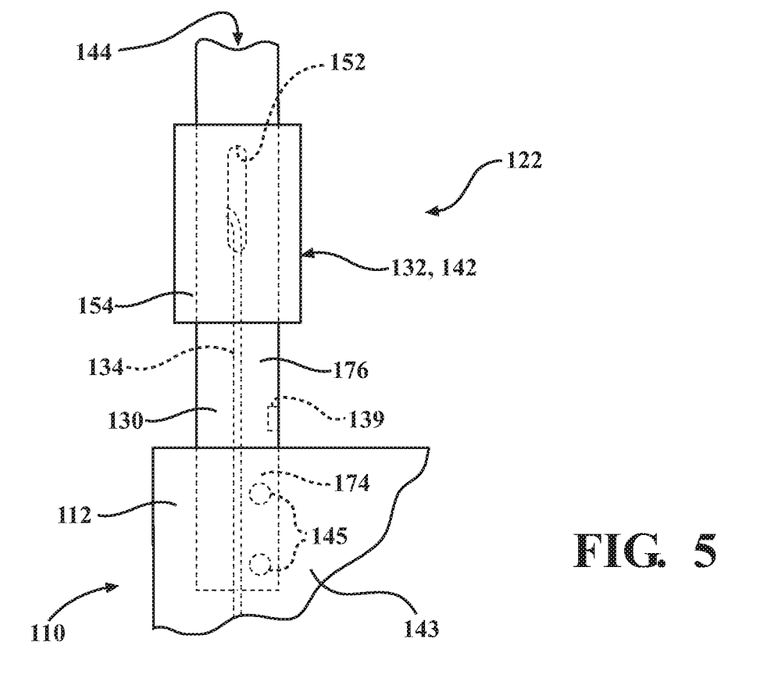
FIG. 5 is a partial cut away view of a materials handling vehicle including a mounting bar assembly according to a second aspect of the present invention.
Figure 5A:
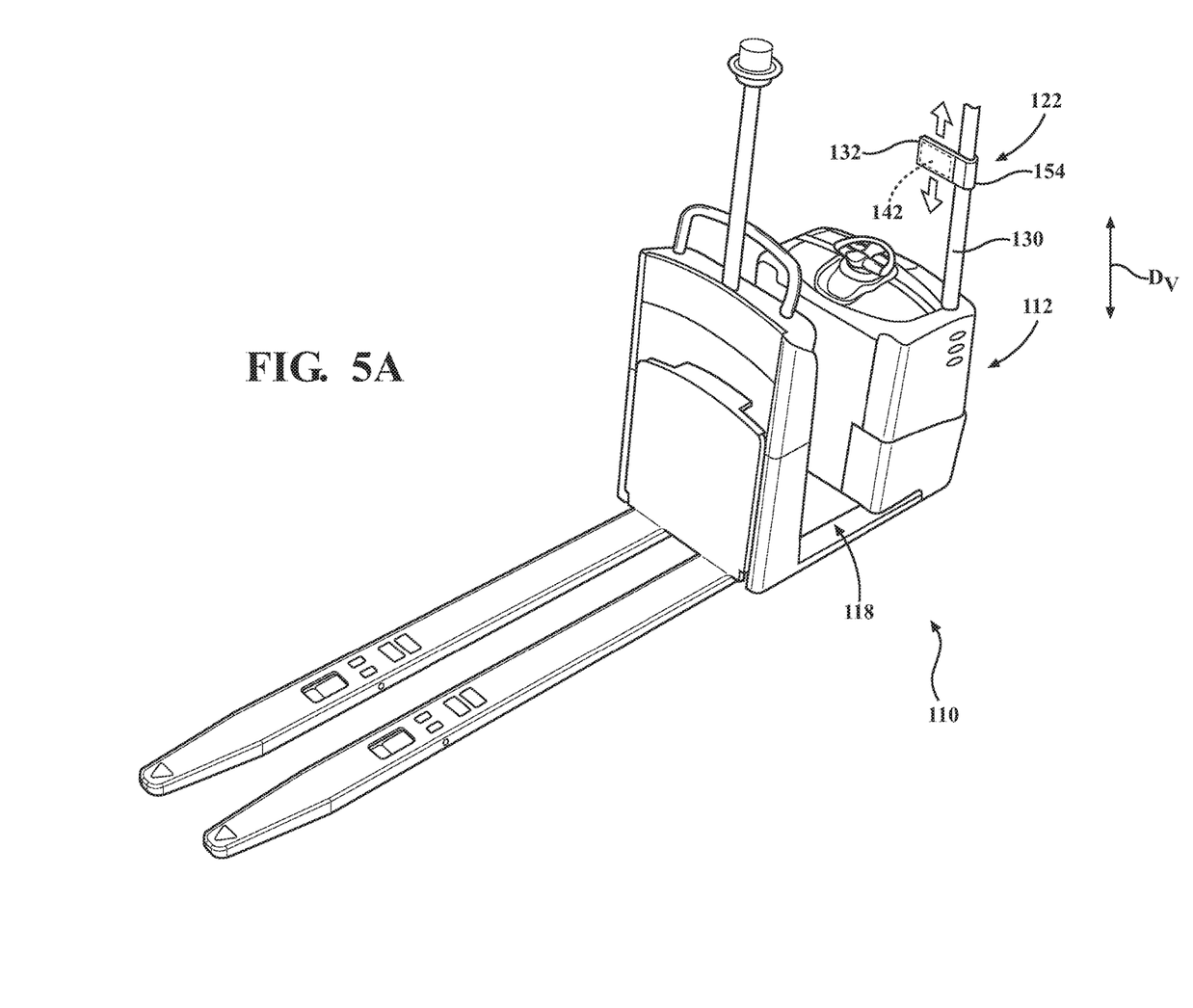
FIG. 5A is a perspective view of a materials handling vehicle including the mounting bar assembly of FIG. 5.

Referring now to FIGS. 5 and 5A, a mounting bar assembly 122 according to another embodiment is illustrated, where structure similar to that described above with reference to FIGS. 1-4C includes the same reference number increased by 100. Only structure that differs from the embodiment of FIGS. 1-4C will be described herein with respect to FIGS. 5 and 5A.

The vehicle 110 according to this embodiment of the invention comprises a mounting bar assembly 122 mounted to the power unit 112. In this embodiment, a mounting bar 130 of the mounting bar assembly 122 comprises a single bar, i.e., as opposed to the mounting bar assembly 22 of FIGS. 1-4C, which includes two side arms 36, 38 and a top member 40, which single bar extends generally vertically upwardly from the power unit 112.

As shown in FIG. 5, the mounting bar 130 includes an elongate slot 152 through which cabling 134 extends, as in the embodiment of FIGS. 1-4C. However, in this embodiment, the housing 132 is mounted to the mounting bar 130 via the clamp member 154 such that the housing and supported electronic device(s) 132/142 can be situated in a plurality of positions vertically along the mounting bar 130 in a vertical direction Dv (see FIG. 5A) for adjusting the position of the housing and support, electronic device(s) 132/142. It is noted that FIG. 5 is shown from the perspective of the back of the mounting bar assembly 122 such that the back side of the clamp member 154 is shown in FIG. 5. The operator would thus be positioned to the right of the mounting bar assembly 122 as shown in FIG. 5 so as to be able to interact with the electronic device(s) 142 while riding on the platform 118.

As shown in FIG. 5, the mounting bar 130 has an inner member 174 and an outer member 176 affixed to the inner member 174 to define the hollow interior portion 144 therebetween. Fastening members 139 such as those described above with reference to FIG. 2 may be used to affix the inner member 174 to the outer member 176, and fastening structures 145 such as those described above with reference to FIG. 3 may be used to facilitate attachment of the inner member 174 to the inner body portion 143 of the power unit 112. The mounting bar 130 may stand alone or support other structures as desired, such as an overhead guard.

With reference to FIG. 5A, the electronic device 142 according to this embodiment comprises a stand-alone touchscreen without any associated buttons on the side (as in the embodiment of FIGS. 1-4C), although it is noted that any type of electronic device could be used with any of the embodiments disclosed herein.

Figure 6:
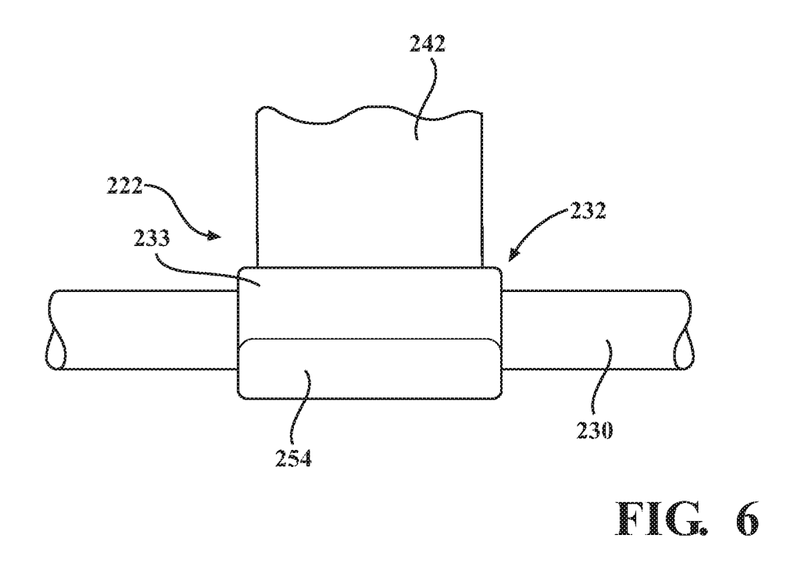
FIG. 6 is a partial cut away view of a materials handling vehicle including a mounting bar assembly according to a third aspect of the present invention.

Referring now to FIG. 6, a mounting bar assembly 222 according to another embodiment is illustrated, where structure similar to that described above with reference to FIGS. 1-4C includes the same reference number increased by 200. Only structure that differs from the embodiment of FIGS. 1-4C will be described herein with respect to FIG. 6. While the electronic device 42 may be enclosed within the housing 32 for mounting to the mounting bar assembly 22 as shown in FIGS. 1-4C and described above, the housing 232 may comprise a bracket 233 to which the electronic device 242 is fastened in any known manner, wherein the bracket 233 with the supported electronic device 242 is mounted to the mounting bar 230 via the clamp member 254. This may be the case with a third party electronic device 242 that is to be mounted to the mounting bar 230 with the mounting bar assembly 222.

Figure 7:
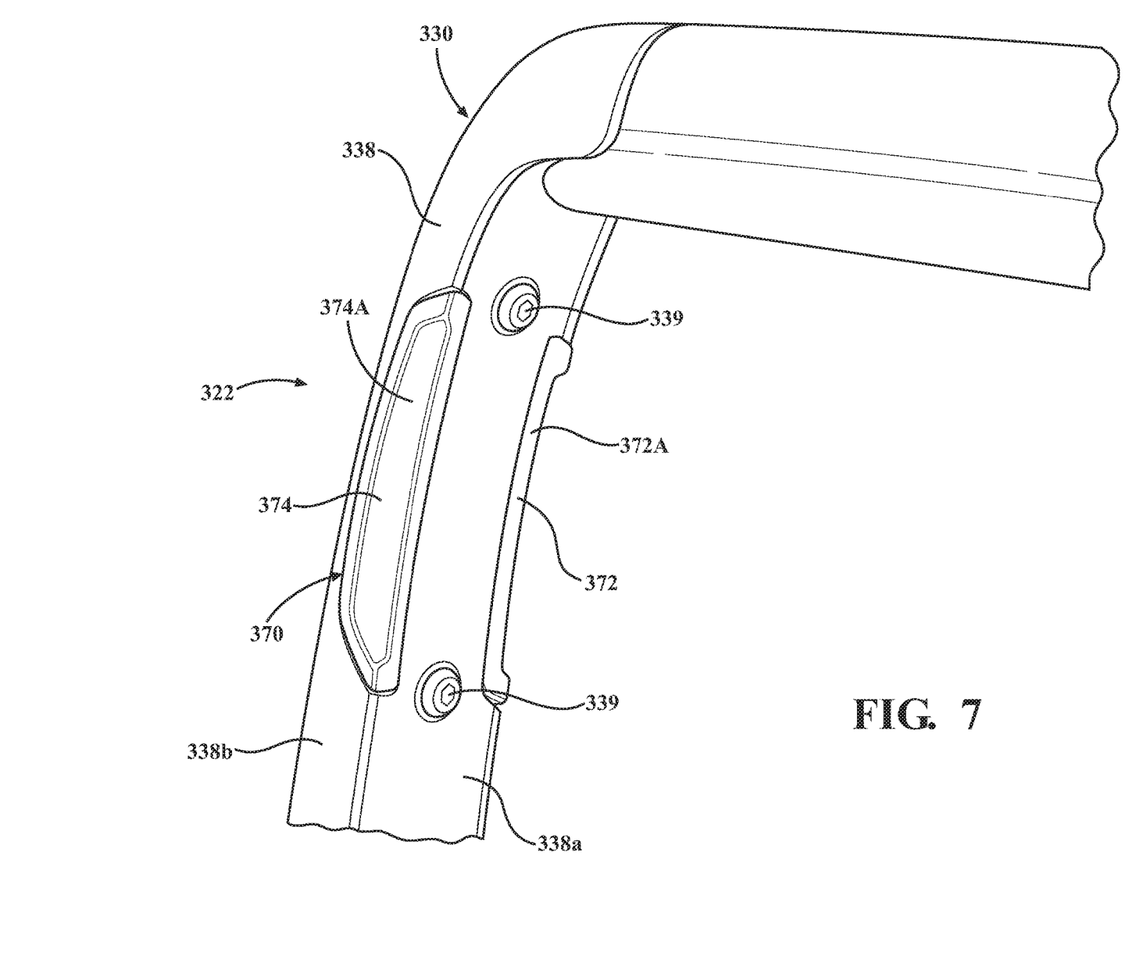
FIG. 7 is a partial perspective view of a portion of a mounting bar assembly including light structure in accordance with another aspect of the present invention.
Figure 8:
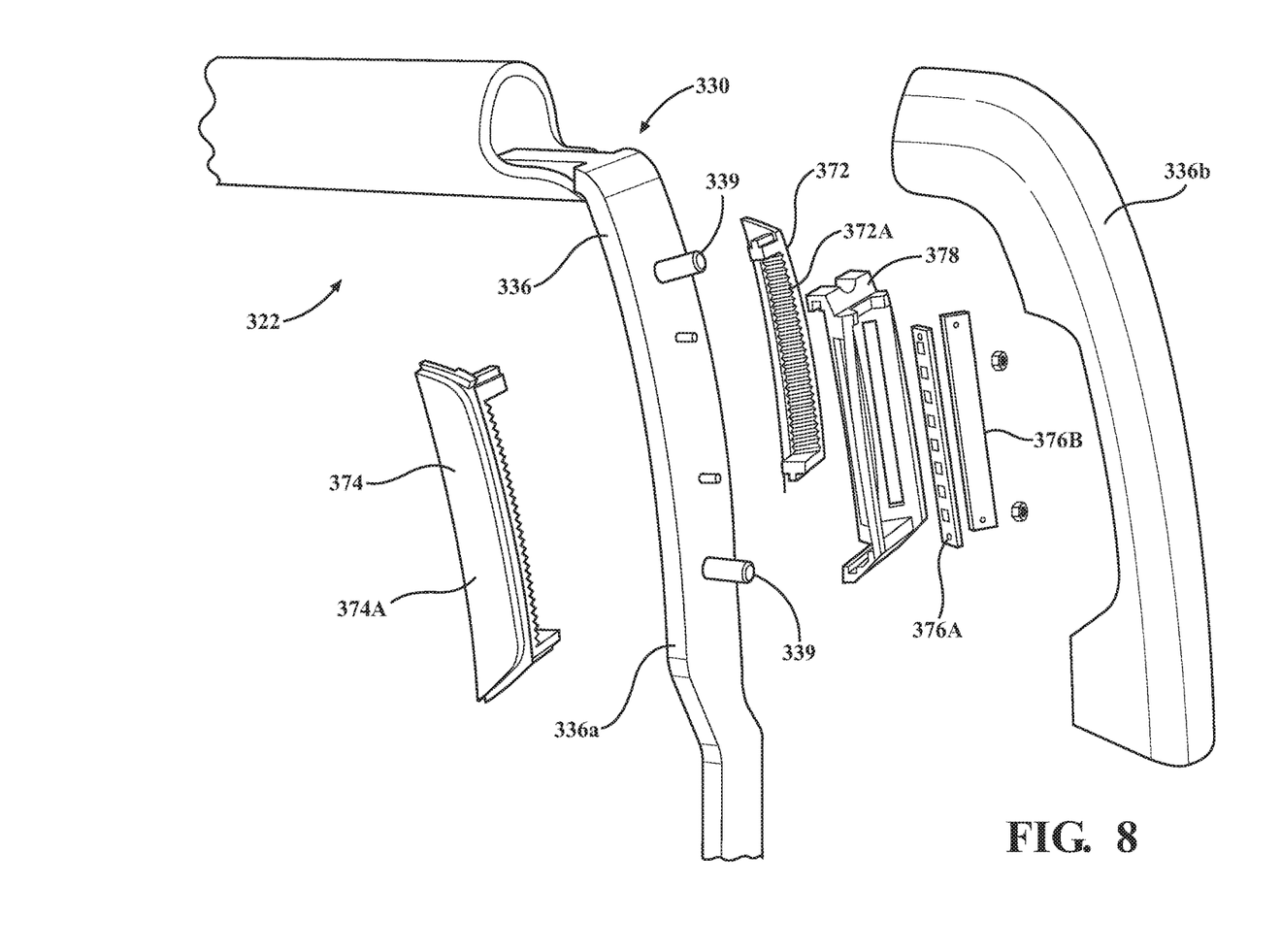
FIG. 8 is an exploded view of another portion of the mounting bar assembly shown in FIG. 7 and showing additional light structure.

Turning now to FIGS. 7 and 8, a mounting bar assembly 322 according to another embodiment is illustrated, where structure similar to that described above with reference to FIGS. 1-4C, includes the same reference number increased by 300. Only structure that differs from the embodiment of FIGS. 1-4C will be described herein with respect to FIGS. 7 and 8. According to this aspect of the invention, the mounting bar assembly 322 includes first and second light structures 370 mounted to the respective first and second side arms 336, 338 of the mounting bar 330 (only the second side arm 338 and its associated light structure 370 is illustrated in FIG. 7 and only the first side arm 336 and its associated light structure 370 is illustrated in FIG. 8). It is noted that the power supply for the light structures 370 is not illustrated in the drawings but preferably comprises wiring extending the from power unit 12 of the vehicle 10 (see FIG. 1).

Each light structure 370 in the embodiment shown comprises a first light portion 372 facing toward the back of the vehicle 10, i.e., toward load handling assembly 16 (see FIG. 1) of the vehicle 10, and a second light portion 374 facing toward the front of the vehicle 10, i.e., away from the load handling assembly 16. The first and second light portions 372, 374 comprise transparent outer coverings 372A, 374A that enable the transmission of light therethrough. The light may be provided from a single source in which case the light may be visible as a single color from the front and back of the vehicle 10, or the light may be provided by separate light sources 376A, 376B such as LED strips (see FIG. 8) supported by a housing 378 such that lights having different colors may be visible from the front and back of the vehicle 10. Since the mounting bar assembly 322 illustrated in FIGS. 7 and 8 includes four different light sources (i.e., two light sources for the light structure 370 on the first side arm 336 and two light sources for the light structure 370 on the second side arm 338), there are four light sources that may be illuminated in up to four different colors at the same time. Further, the light sources themselves may be capable of emitting different colored lights, e.g., the light sources may be multi-colored LEDs, to allow many different light color combinations. Additionally or alternatively, the transparent outer coverings 372A, 374A may be tinted to different colors such that the light visible from the front and back of the vehicle 10 is distinguishable. Moreover, all four light sources may be turned on and off independently from one another and the light patterns of all four light sources may be independent from one another.

The light structures 370 according to this aspect of the invention may be used on a vehicle 10 in addition to light source 380 located at the top of pole 328 as shown in FIG. 1, or the light structures 370 according to this aspect of the invention may replace the light source 380. Since the light structures 370 according to this aspect of the invention are mounted within the first and second side arms 336, 338 of the mounting bar 330 and are thus close to the eye level, pedestrians and/or the operator may be able to see them easily from most positions around the vehicle 10. The light structures 370 and/or the light source 380 may be used to communicate the status of the vehicle, e.g., a certain light color may be emitted from one or more of the light sources 376A, 376B, 380 while a vehicle is being remotely controlled, such as by the operator or by a warehouse management system (WMS), and/or to indicate the travel direction of the vehicle 10.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A mounting bar assembly mounted to a materials handling vehicle comprising:
   a mounting bar extending from a body portion of the materials handling vehicle;
   a housing mounted to the mounting bar, the housing supporting at least one electronic device; and
   cabling that extends to the housing through a hollow interior portion defined within the mounting bar, the cabling providing communication between the at least one electronic device and control structure of the vehicle;
   wherein the housing is mounted to the mounting bar such that the housing can be situated in a plurality of positions along at least a portion of the length of the mounting bar while the cabling is maintained within the hollow interior portion.

2. The mounting bar assembly of claim 1, wherein the mounting bar comprises an inner member and an outer member affixed to the inner member to define the hollow interior portion therebetween.

3. The mounting bar assembly of claim 2, further comprising fastening members that affix the inner member to the outer member, wherein each of the fastening members is located on an inner side of the mounting bar.

4. The mounting bar assembly of claim 2, wherein the inner member extends into and is affixed to the body portion of the vehicle.

5. The mounting bar assembly of claim 1, wherein the cabling extends from the housing into the hollow interior portion of the mounting bar through an elongate slot formed in the mounting bar.

6. The mounting bar assembly of claim 5, further comprises a clamp member that is affixed to the housing and surrounds the mounting bar therebetween to secure the housing to the mounting bar.

7. The mounting bar assembly of claim 6, wherein the clamp member covers the slot and the cabling extending through the slot to the housing.

8. The mounting bar assembly of claim 7, wherein the cabling includes sufficient slack so as to allow the housing to be situated in a plurality of positions along the mounting bar.

9. The mounting bar assembly of claim 1, wherein the mounting bar is mounted proximate to an operator station of the materials handling vehicle such that an operator can interact with the at least one electronic device while positioned in the operator station.

10. The mounting bar assembly of claim 9, wherein the mounting bar extends generally vertically upwardly from the body portion of the materials handling vehicle.

11. The mounting bar assembly of claim 1, further comprising at least one light structure mounted to the mounting bar for emitting light.

12. The mounting bar assembly of claim 11, wherein the light structure emits light that is visible from the front and back of the materials handling vehicle.

13. The mounting bar assembly of claim 12, wherein the light structure is capable of emitting lights of different colors toward the front and back of the materials handling vehicle.

14. The mounting bar assembly of claim 11, wherein the mounting bar includes two light structures, one mounted in a first side arm of the mounting bar and one mounted in a second side arm of the mounting bar, the first and second side arms of the mounting bar extending from the body portion of the vehicle.

15. A mounting bar assembly mounted to a materials handling vehicle comprising:
   a mounting bar comprising:
      a first side arm extending from a body portion of the materials handling vehicle;
      a second side arm extending from the body portion of the materials handling vehicle; and
      a top member spanning between the first side arm and the second side arm;
   a housing mounted to the top member, the housing supporting at least one electronic device; and
   cabling that extends to the housing through a hollow interior portion defined within the top member and at least one of the first side arm and the second side arm, the cabling providing communication between the at least one electronic device and control structure of the vehicle;
   wherein the housing is mounted to the top member such that the housing can be situated in a plurality of horizontal positions along the top member while the cabling is maintained within the hollow interior portion.

16. The mounting bar assembly of claim 15, wherein at least one of the first side arm and the second side arm comprises an inner member and an outer member affixed to the inner member to define a portion of the hollow interior portion therebetween.

17. The mounting bar assembly of claim 16, further comprising fastening members that affix the inner member to the outer member, wherein each of the fastening members is located on an inner side of the mounting bar.

18. The mounting bar assembly of claim 16, wherein the inner member extends into and is affixed to the body portion of the vehicle.

19. The mounting bar assembly of claim 15, wherein the cabling extends from the housing into the hollow interior portion of the mounting bar through an elongate slot formed in the top member of the mounting bar.

20. The mounting bar assembly of claim 19, wherein the slot is formed in an underside of the top member.

21. The mounting bar assembly of claim 20, further comprising a clamp member that is affixed to the housing and surrounds the top member therebetween to secure the housing to the top member.

22. The mounting bar assembly of claim 21, wherein the clamp member covers the slot and the cabling extending through the slot to the housing.

23. The mounting bar assembly of claim 22, wherein the cabling includes sufficient slack so as to allow the housing to be situated in a plurality of horizontal positions along the top member.

24. The mounting bar assembly of claim 15, wherein the first side arm and the second side arm are mounted proximate to an operator station of the materials handling vehicle such that an operator can interact with the at least one electronic device while positioned in the operator station.

25. The mounting bar assembly of claim 24, wherein the first side arm and the second side arm extend generally vertically upwardly from the body portion of the materials handling vehicle and are spaced apart from one another and located adjacent to respective first and second sides of the body portion.

26. The mounting bar assembly of claim 15, further comprising at least one light structure mounted to the mounting bar for emitting light.

27. The mounting bar assembly of claim 26, wherein the mounting bar includes two light structures, one mounted in the first side arm of the mounting bar and one mounted in the second side arm of the mounting bar.

28. The mounting bar assembly of claim 27, wherein the light structures emit light that is visible from the front and back of the materials handling vehicle.

29. The mounting bar assembly of claim 28, wherein the light structures are capable of emitting lights of different colors toward the front and back of the materials handling vehicle.

30. A materials handling vehicle comprising:
   a main body portion including a power unit and an operator station;
   a load handling assembly;
   a mounting bar extending from the main body portion of the materials handling vehicle;
   a housing mounted to the mounting bar, the housing supporting at least one electronic device; and
   cabling that extends to the housing through a hollow interior portion defined within the mounting bar, the cabling providing communication between the at least one electronic device and control structure of the vehicle;
   wherein the housing is mounted to the mounting bar such that the housing can be situated in a plurality of positions along at least a portion of the length of the mounting bar while the cabling is maintained within the hollow interior portion.

31. The materials handling vehicle of claim 30, wherein the mounting bar comprises an inner member and an outer member affixed to the inner member to define the hollow interior portion therebetween.

32. The materials handling vehicle of claim 31, further comprising fastening members that affix the inner member to the outer member, wherein each of the fastening members is located on an inner side of the mounting bar.

33. The materials handling vehicle of claim 31, wherein the inner member extends into and is affixed to the body portion of the vehicle.

34. The materials handling vehicle of claim 30, wherein the cabling extends from the housing into the hollow interior portion of the mounting bar through an elongate slot formed in the mounting bar.

35. The materials handling vehicle of claim 34, wherein the slot is formed in an underside of the top member.

36. The materials handling vehicle of claim 34, further comprising a clamp member that is affixed to the housing and surrounds the mounting bar therebetween to secure the housing to the mounting bar.

37. The materials handling vehicle of claim 36, wherein the clamp member covers the slot and the cabling extending through the slot to the housing.

38. The materials handling vehicle of claim 37, wherein the cabling includes sufficient slack so as to allow the housing to be situated in a plurality of positions along the mounting bar.

39. The materials handling vehicle of claim 30, wherein the mounting bar extends generally vertically upwardly from the body portion of the materials handling vehicle.

40. The materials handling vehicle of claim 30, wherein the mounting bar is located on a side of the operator station opposite from the load handling assembly.

41. The materials handling vehicle of claim 30, further comprising at least one light structure mounted to the mounting bar for emitting light.

42. The materials handling vehicle of claim 41, wherein the light structure emits light that is visible from the front and back of the materials handling vehicle.

43. The materials handling vehicle of claim 42, wherein the light structure is capable of emitting lights of different colors toward the front and back of the materials handling vehicle.

* * * * *